(12) United States Patent
MacNeille et al.

(10) Patent No.: US 10,816,340 B2
(45) Date of Patent: Oct. 27, 2020

(54) SELF-STABILIZING AUTONOMOUS DEVICES AND USE THEREOF IN AUTONOMOUS VEHICLES

(71) Applicant: Ford Global Technologies, LLC, Dearborn, MI (US)

(72) Inventors: Perry MacNeille, Lathrup Village, MI (US); Bo Wu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 16/174,166

(22) Filed: Oct. 29, 2018

(65) Prior Publication Data

US 2020/0132466 A1 Apr. 30, 2020

(51) Int. Cl.
*G01C 21/28* (2006.01)
*G05D 1/00* (2006.01)
*G05D 1/02* (2020.01)
*G01C 21/18* (2006.01)

(52) U.S. Cl.
CPC ........... *G01C 21/18* (2013.01); *G05D 1/0088* (2013.01); *G05D 1/027* (2013.01); *G05D 1/0246* (2013.01); *G05D 2201/0213* (2013.01); *G05D 2201/0216* (2013.01)

(58) Field of Classification Search
CPC .... G01C 21/18; G05D 1/0088; G05D 1/0246; G05D 1/027; G05D 2201/0213; G05D 2201/0216
See application file for complete search history.

(56) References Cited

U.S. PATENT DOCUMENTS

| | | | |
|---|---|---|---|
| 7,119,715 B2 | 10/2006 | Orita | |
| 2007/0038727 A1 | 2/2007 | Bailey et al. | |
| 2008/0230285 A1* | 9/2008 | Bewley | B62D 61/12 180/8.4 |

FOREIGN PATENT DOCUMENTS

| | | |
|---|---|---|
| CN | 107458620 A | 12/2017 |
| CN | 107862445 A | 3/2018 |

OTHER PUBLICATIONS

Ferrer et al., "Robot Companion: A Social-Force based approach with Human Awareness-Navigation in Crowded Environments," 2013 IEEE/RSJ International Conference on Intelligent Robots and Systems, Tokyo, 2013, pp. 1688-1694. doi: 10.1109/IROS.2013.6696576.

(Continued)

*Primary Examiner* — Michael D Lang
(74) *Attorney, Agent, or Firm* — Brandon Hicks; Eversheds Sutherland (US) LLP

(57) ABSTRACT

Self-stabilizing autonomous devices and use thereof in autonomous vehicles are disclosed herein. An example device can include a body member having a central axis extending therethrough, a delivery platform disposed on a first end of the body member, a translation assembly disposed on a second end of the body member, a ballast assembly, and a controller that is configured to control operation of at least one of the translation assembly or the ballast assembly so as to balance forces exerted on the device and maintain the delivery platform in a desired orientation as the device moves across an operating surface.

20 Claims, 11 Drawing Sheets

(56) References Cited

OTHER PUBLICATIONS

Ivanov et al.(2017). Adoption of robots, artificial intelligence and service automation by travel, tourism and hospitality companies—a cost-benefit analysis. International Scientific Conference "Contemporary tourism—traditions and innovations", Oct. 19-21, 2017, Sofia University (9 pages).

"Creating a supportive environment for the development of wide-ranging communication and information services for foreign visitors," Cabinet Office of Japan, Published Jan. 31, 2017 (5 pages).

\* cited by examiner

SELF-STABILIZING AUTONOMOUS DEVICES AND USE THEREOF IN AUTONOMOUS VEHICLES

FIELD OF THE DISCLOSURE

The disclosure generally relates to autonomous devices, and more particularly relates to devices, such as autonomous ballbots, which are capable of self-stabilization during operation and more specifically, but not by way of limitation, when operating in an autonomous vehicle such as a transit vehicle.

BACKGROUND

Autonomous devices are currently being deployed to provide various service-related functions. For example, autonomous devices can be used to transport riders, deliver inventory, and provide security monitoring—just to name a few. Moreover, while autonomous devices typically serve a general purpose and operate in a static environment, these autonomous devices are not well-suited to operating in a dynamic environment that exerts or causes exertion of forces on the autonomous devices that could destabilize the autonomous devices and cause them to tip over. For example, an autonomous device, which cannot self-stabilize, might likely tip over when operating inside a moving vehicle. Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
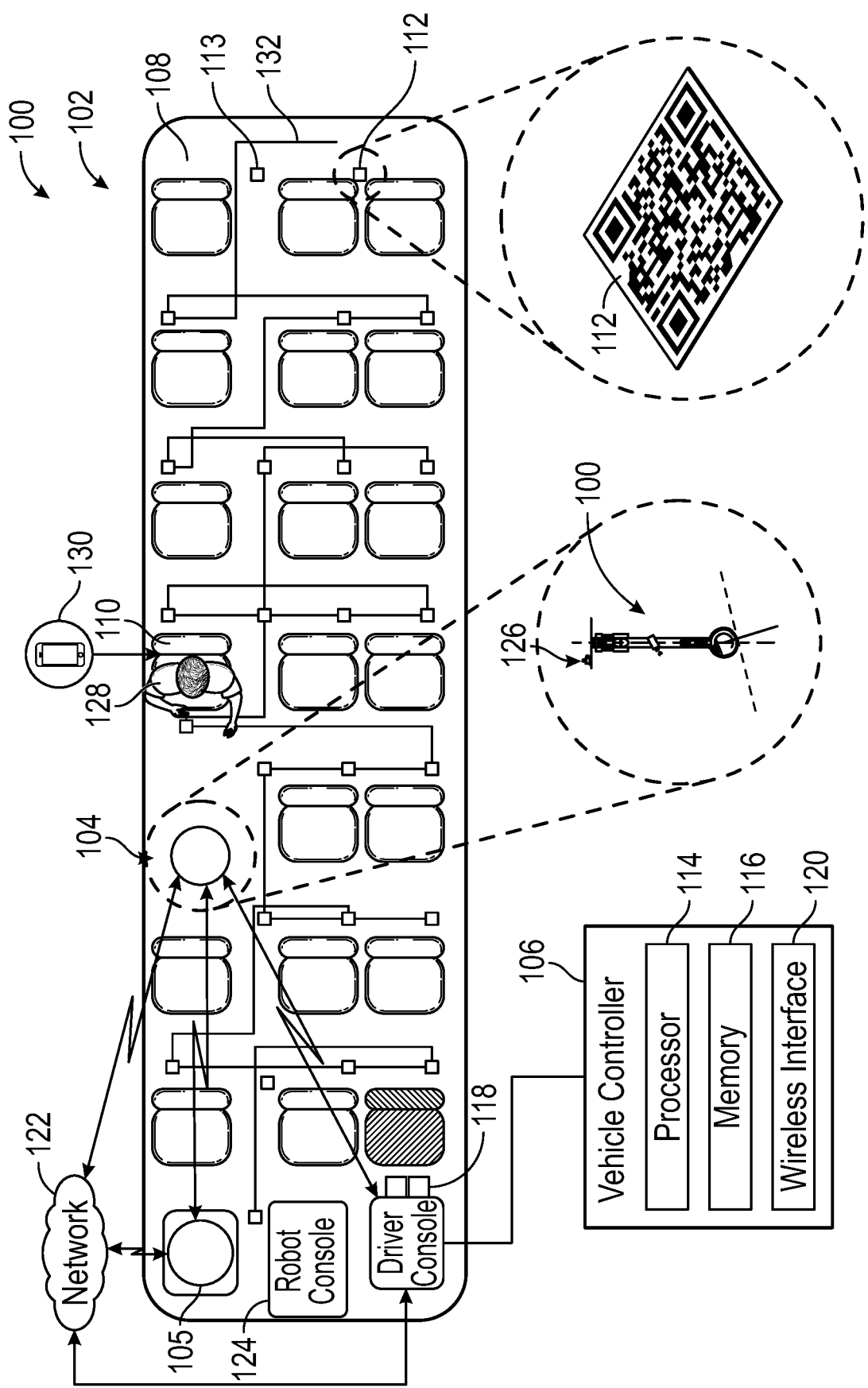
FIG. 1 depicts a generalized environment for practicing aspects of the present disclosure.

The disclosure is related to self-stabilizing autonomous devices that operate in dynamic environments, such as within transit vehicles. In various embodiments, an example self-stabilizing autonomous device comprises a ballbot that incorporates a delivery platform. An example ballbot of the present disclosure is programmed to autonomously operate within a transit vehicle. In some embodiments, the ballbot facilitates commerce within the transit vehicle by autonomously delivering goods such as refreshments to passengers. In another embodiment, the ballbot can shuttle objects between passengers within the transit vehicle.

In some embodiments, the ballbot can also act like a conductor, collecting fares after the passenger sits down. If fares are collected at an entrance boarding/deboarding is too slow. If they are collected at a fixed transit stop, dynamic transit stops are infeasible. Thus, allowing an autonomous device such as a ballbot to perform these functions during transit solves commonly encountered issues during transit. In other non-limiting use cases, the ballbot can be configured to stow items like wet umbrellas or baggage from passengers assigned to a particular seat. In yet other embodiments the ballbot can function as a telepresence for a remote operator or even provide cleaning functions within the transit vehicle such as vacuuming and moping.

In various embodiments, an example ballbot of the present disclosure is configured with a ballast assembly and a translation assembly that can each be independently or cooperatively controlled using a controller in order to compensate for forces exerted on the ballbot due to a plurality of ballbot destabilizing conditions. In general, the plurality of ballbot destabilizing conditions comprise forces that are generated due to any combination of movement of the transit vehicle, movement of the ballbot, forces exerted on the ballbot by objects placed on a delivery platform of the ballbot, operating surface slope, and gravity. Taken together, the plurality of ballbot destabilizing conditions create forces (e.g., torques and/or heave) that can be measured relative to a contact point at which the translation assembly contacts the operating surface within the transit vehicle. In general, the operating surface is the floor of the transit vehicle on top of which the ballbot operates.

In one or more embodiments, part of the plurality of ballbot destabilizing conditions includes transit vehicle forces. An example ballbot of the present disclosure communicates with a controller or processor of the transit vehicle to receive the transit vehicle forces. These forces can include, but are not limited to, heave, pitch, roll, yaw rate, yaw acceleration, horizontal acceleration, and rotation of the transit vehicle.

The example ballbot of the present disclosure can process these transit vehicle forces in combination with input from an inertial measurement unit (IMU) of the ballbot that measures ballbot/device motion forces produced by movements of the ballbot as it moves around the transit vehicle on the operating surface. An example ballbot IMU is illustrated in the schematic diagram of FIG. 3 that is disclosed infra.

In some embodiments, the IMU of the ballbot will also utilize camera input obtained through a camera mounted on the ballbot. In various embodiments, the data sensed by the camera includes color images or video, range, or distance data. The camera input is processed to determine a slope of the operating surface, the movement of the ballbot on the operating surface, and the identification, location, and orientation of fiduciary objects located on the operating surface. In general, the fiduciary objects provide information to the ballbot that allow the ballbot to orient itself within the transit vehicle and to navigate within the transit vehicle.

In some embodiments, the ballbot can also utilize signals obtained from the transit vehicle that are indicative of motion such as steering, braking, velocity, suspension control, and the like. These signals provide the ballbot with advanced input that can be used to predict forces that are or will be exerted on the ballbot. For example, when the transit vehicle begins to turn, a signal indicating that the wheels are turning can be obtained from vehicle sensors that sense either movement of the steering linkages or movement within a steering gearbox. In another embodiment, rather than sensing specific movement, the vehicle sensors may sense an impending movement from other means such as a navigation system. For example, a sensor may indicate that the transit vehicle is within 100 feet of a right turn based on the current navigation plans of the transit vehicle. Other motions can be sensed through monitoring of other components of the transit vehicle that contribute to changes in transit vehicle motion.

In general, the ballbot can sense its orientation of the ballbot relative to vehicle coordinates when the ballbot is operating within a transit vehicle. The vehicle coordinates comprise three coordinate systems, road coordinates (generally a geodetic coordinate system such as longitude—latitude—elevation, and so forth). The vehicle coordinate system whose origin could be the (center of rotation) CR point projected to the floor of the vehicle and the ballbot coordinate system. Data (position, acceleration, mass, force, and so forth) used by the ballbot are expressed in one of the three and need to be translated between systems. Also, translations are constantly changing, requiring the ballbot to constantly adapt and stabilize during operation within the transit vehicle.

The vehicle coordinate system is the coordinate system rigidly connected to the operating surface the ballbot moves on. The vehicle suspension allows relative motion between the two coordinate systems. Road height sensors measure this motion and are provided to the ballbot over a wireless network.

In yet other embodiments, the ballbot can evaluate or consider an intended path of motion of the ballbot to predict possible instability. For example, if the ballbot is programmed to traverse a route within the transit vehicle, the ballbot can sense its current position and desired future position based on navigation instructions. This data can be used to predict or anticipate forces that will be experienced by the motion of the ballbot.

In view of the foregoing examples, a ballbot of the present disclosure is adapted to perform, if required, a multifactorial analysis considering each of the plurality of ballbot destabilizing conditions in order to compute forces that are acting on the ballbot. Generally, these forces function to destabilize or shift a center of mass of the ballbot, which results in instability of the ballbot. Correspondingly, when the ballbot is unstable, objects on the delivery platform on the ballbot may slide off. Thus, the ballbot of the present disclosure is configured to react to this center of mass shift by balancing the forces acting on the ballbot. In some embodiments, this balancing of forces is accomplished using a ballast assembly and/or movement of the ballbot through selective control. Broadly, the ballbot can self-stabilize in such a way that the delivery platform is held in a desired position (e.g., where objects on the delivery platform do not slide off).

In an example embodiment, a ballbot of the present disclosure is configured to move around the transit vehicle on the operating surface using the one or more fiduciary objects for navigation. The ballbot transports at least one object placed on a delivery platform, and the ballbot is configured to balance forces measured at a contact point between the ballbot and the operating surface. In some embodiments, the forces are caused by at least one of motion of the transit vehicle, motion of the ballbot, and/or gravity. In some embodiments, the ballbot balances the forces using at least one of a ballast assembly, a translation assembly, or a combination thereof. To be sure, the forces acting on the ballbot are balanced so as to stabilize the ballbot and to maintain a delivery platform of the ballbot in a desired orientation.

In some embodiments, the ballbots of the present disclosure can train in self-stabilization behaviors through motor babbling and/or iteratively comparing and copying the self-stabilization behaviors of other ballbots. When improvements in the self-stabilization behaviors are found, older and less advantageous self-stabilization behaviors are overwritten. This process can occur each time a ballbot of the present disclosure encounters another ballbot of the present disclosure.

Illustrative Architecture

Turning now to the drawings, FIG. 1 depicts an illustrative architecture 100 in which techniques and structures for providing the systems and methods disclosed herein may be implemented. The illustrative architecture 100 may include a transit vehicle 102 and a ballbot 104. A second ballbot 105 is illustrated, but is described in greater detail with respect to aspects disclosed in relation to FIG. 10. In one embodiment, the transit vehicle 102 comprises a transit vehicle controller 106, an operating surface 108, seats such as seat 110, and a plurality of fiduciary objects, such as fiduciary object 112. The transit vehicle 102 can comprise an autonomous vehicle in some embodiments. In other embodiments, the transit vehicle 102 is a non-autonomous (human-driven) vehicle.

The transit vehicle controller 106 can comprise a processor 114, a memory 116, and a wireless interface 120. The transit vehicle controller 106 interacts with one or more sensors 118. The processor 114 is configured to execute instructions stored in the memory 116 to navigate and drive the transit vehicle 102. The processor 114 is also configured to execute instructions stored in the memory 116 to receive input from the one or more sensors 118. In some embodiments, the one or more sensors 118 can include any combination of sensors that measure forces that are indicative of any of heave, pitch, roll, yaw rate, yaw acceleration, horizontal acceleration, and rotation of the transit vehicle. Each of these forces is disclosed in greater detail infra. In one example, a sensor can include a transit vehicle IMU that can comprise any of a three-axis accelerometer, a three-axis gyroscope, a three-axis magnetometer, and an altimeter.

These forces are generally referred to collectively as transit vehicle forces. The transit vehicle forces are transmitted to the ballbot 104 in some embodiments over the wireless interface 120 using a network 122. The network 122 may include any one or a combination of multiple different types of networks, such as cable networks, the Internet, wireless networks, and other private and/or public networks. In some instances, the network 122 may include Bluetooth, cellular, near-field communication (NFC), Wi-Fi, or Wi-Fi direct. In some embodiments, the network 122 includes a device-to-device communication over a short-range wireless connection. When more than one ballbot is present in the transit vehicle 102, the network 122 can include a mesh network. Thus, when the ballbot 104 and another ballbot 105 are operating in the transit vehicle 102 at the same time, the ballbots 104 and 105 can create a mesh network with the transit vehicle controller 106 in order to communicate with one another.

In one or more embodiments, the transit vehicle 102 can also include a ballbot console 124 that allows for recharging the ballbot 104 and for dispensing objects for sale and delivery using the ballbot 104. For example, an object 126 such as a coffee cup can be obtained from the ballbot console 124 by the ballbot 104. In an example use case, a passenger 128 can order the object 126 using an application on the passenger's mobile device 130 (e.g., smartphone). The ballbot console 124 receives the order and hails the ballbot 104 to pick up and deliver the object 126 to the passenger 128.

In order to direct navigation of the ballbot 104, the fiduciary objects such as fiduciary object 112 are positioned in various locations on the operating surface 108. Each of the fiduciary objects comprises, for example, a means for encoding instructions that are utilized by the ballbot 104. The instructions can comprise two- or three-dimensional objects such as quick response (QR) codes that encode information.

In one example, the fiduciary object 112 is a three-dimensional black and white QR code with information about the fiduciary object's location relative to the operating surface 108. More information can be stored in a fiduciary object of a given size if color is also used to store coded binary information. If parts of the fiduciary object have different depths, the depths can also be used to code information. Thus, in some embodiments, the fiduciary object 112 comprises pixels that can each have a unique hue. The pixels can be read by the ballbot 104 as a sequence of color images where each pixel of the image is coded with the range (e.g., distance) between the pixel and the object. As noted above, the fiduciary objects are also oriented to give the ballbot 104 directional information as well as translation information. For example, the fiduciary object 112 is oriented to point towards another fiduciary object 113. The ballbot 104 can sense or read the fiduciary object 112 and decipher its orientation in order to move itself to the location of the fiduciary object 113 if a desired destination for the ballbot 104 is the location of the fiduciary object 113 or another location that is navigated to via the ballbot 104 passing by or through the location of the fiduciary object 113.

In some embodiments the camera captures three-dimensional images and uses these three-dimensional images to measure a distance between the camera and the pixel of a fiduciary object. For interpreting (for example) a QR code the processor of the camera uses an absolute distance to each pixel to determine the relative height of the pixels. The relative heights form a code that augments the code embedded in the pixel colors. Various three-dimensional camera technologies can be implemented, where some measure relative heights of the pixels without measuring the absolute distance. Three-dimensional cameras can sometimes replace LIDAR at lower cost. The aspects of both depth and color are included for completeness. Color three-dimensional QR codes can be printed with three-dimensional printers and can form a fiduciary. The orientation of the 3D code in the vehicle can help to orient the robot in the vehicles. QR codes are refereed for descriptive purposes, but any code using pixel color and height, and has an indication of direction can be used.

In various embodiments, the ballbot 104 can be configured to traverse between the fiduciary objects in a predetermined pattern such as the path 132. In other embodiments, the ballbot 104 can directly navigate to a specific fiduciary object using other fiduciary objects as waypoints or guidelines to navigate to the desired fiduciary object. In some embodiments, each seat on the transit vehicle 102 is proximate to a fiduciary object so that passengers can obtain objects from the ballbot 104 without being required to leave their seats.

Figure 2A:
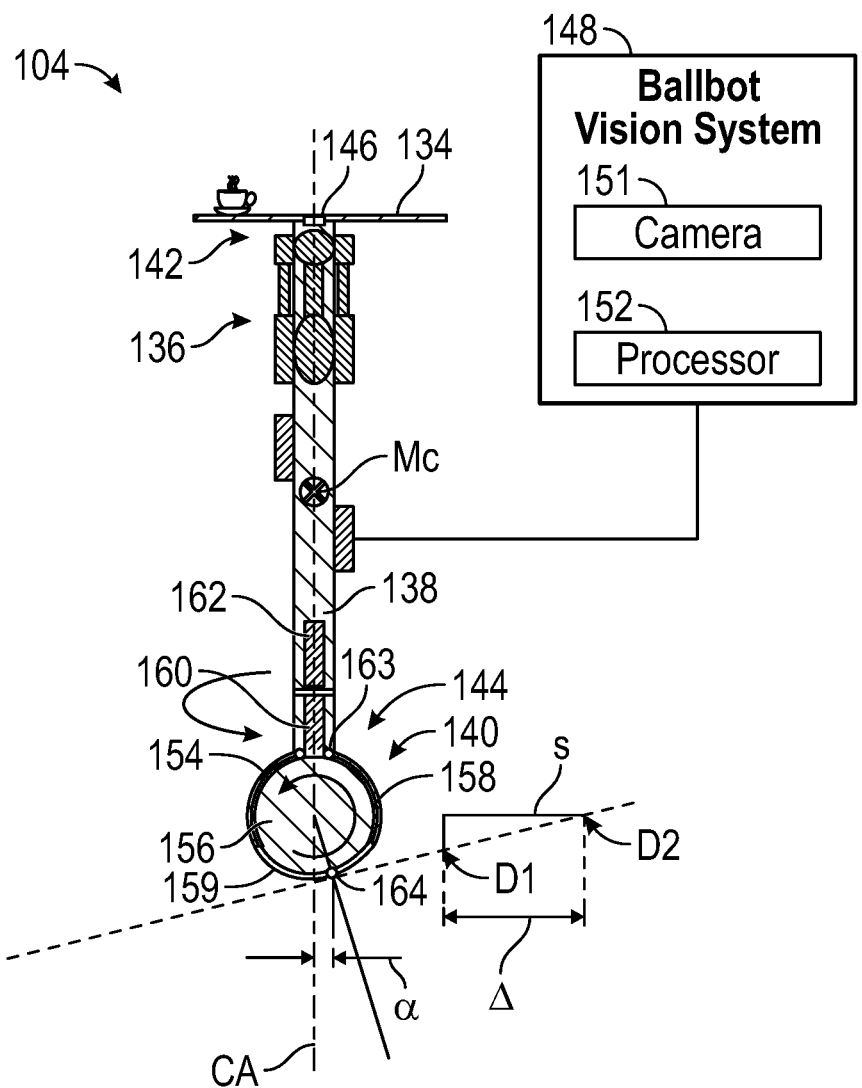
FIG. 2A depicts a ballbot of the present disclosure.

FIG. 2A depicts in more detail the ballbot (e.g., device) 104 of FIG. 1. The ballbot 104 generally comprises a delivery platform 134, a ballast assembly 136, a body member 138, and a translation assembly 140. In some embodiments, the body member 138 is a rigid tubular shaft having a first end 142 and a second end 144. The delivery platform 134 can be coupled to the first end 142 of the body member 138. The translation assembly 140 is coupled to the second end 144 of the body member 138. A central axis $C_A$ extends through the body member 138 and is utilized as a reference for orientation of the ballbot 104 relative to the operating surface of the transit vehicle, as well as orienting the placement of components of the ballbot 104. For example, the delivery platform 134 is positioned orthogonally to the central axis $C_A$.

A stress sensor 146 is positioned at a coupling location between the delivery platform 134 and the first end 142 of the body member 138. The coupling location can include any fixed or releasable connection or interface that joins the delivery platform 134 to the body member 138. The stress sensor 146 senses any of shear force, normal force, and/or torque force caused by a mass of the delivery platform 134 and one or more objects on the delivery platform 134 such as the object 126. Collectively, these forces are referred to in some embodiments as delivery platform force components. In general, the delivery platform force components can contribute to ballbot destabilization. For example, when the object 126 is placed near an edge of the delivery platform 134, a weight of the object 126 induces a torque force that is measurable from both the interface that joins the delivery platform 134 to the body member 138 and a contact point where the translation assembly 140 contacts the operating surface 108 of the transit vehicle 102.

In some embodiments, the delivery platform 134 can pivot at its coupling location between the delivery platform 134 and the first end 142 of the body member 138. An actuator can tilt the delivery platform 134 if self-stabilization of the ballbot 104 is not completely achieved.

In some embodiments, the ballbot 104 comprises a ballbot vision system 148. The ballbot vision system 148 can comprise a color video camera 151 and a processor 152. Again, as noted above, the color video camera 151 comprises a three-dimensional color video camera used to detect the fiduciaries. When the video camera 151 images the floor of the vehicle the processor 152 can determine a gradient of the floor in the coordinate system of the robot. This data is input to the ballbot controller which moves the ball to maintain ballbot stability.

The processor 152 is configured to utilize the color video camera 151 to enable ground tracking and range finding. In certain embodiments, the processor 152 is configured to calculate slope of the operating surface 108 of the transit vehicle 102. The processor 152 is also configured to calculate movement of the translation assembly 140 along the operating surface 108 of the transit vehicle 102. Also, as noted above, the processor 152 can read data encoded into the fiduciary objects installed on the operating surface 108 of the transit vehicle 102. In more detail, the video obtained from the color video camera 151 includes images of the fiduciary objects (QR code). The processor 152 utilizes QR code reading logic to read data encoded into the fiduciary object. Again, this information can include an identification of the fiduciary object (such as an identifier that uniquely identifies a fiduciary object), a location of the fiduciary object relative to the operating surface 108 of the transit vehicle 102, and an orientation of the fiduciary object. This data enables the ballbot 104 to navigate around the operating surface 108 using the fiduciary objects as waypoints and/or navigation data sources.

With respect to motion of the ballbot 104, the translation assembly 140 generally comprises a shell 154 and a sphere 156. The shell 154 comprises a spherical sidewall 158 that at least partially encloses and retains the sphere 156. The shell 154 can rotate clockwise and counterclockwise by way of a shell motor 160 (e.g., an actuator) that is located within the body member 138 of the ballbot 104. In various embodiments, the sphere 156 can be coupled with the shell 154 using a retaining means 159, such as a strap that both prevents selective disengagement of the sphere 156 from the shell 154 and allows the shell 154 to control directional turning of the sphere 156. In this configuration, the sphere 156 is capable of both forward and rearward rotational movement that is orthogonal to the turning direction of the shell 154.

The sphere 156 can be manufactured from a resilient material such as a rubber or plastic/polymer. In one example, the sphere 156 is an inflatable elastomeric ball. In various embodiments, the sphere 156 is rotated using sphere drives, such as a sphere drive 163 (e.g., omni-wheels placed perpendicular to an outermost surface of the sphere 156). The number of sphere drives utilized in the ballbot 104 can vary according to design requirements. Also, the sphere drives can be actuated using output from the shell motor 160. In some embodiments, idler balls mounted on a ring may be used to secure the sphere 156 to the shell 154.

In one or more embodiments, the shell motor 160 and the sphere drive 163 are independently controllable by a ballbot controller 162. Details regarding the ballbot controller 162 are disclosed with reference to FIG. 3. In general, the ballbot controller 162 selectively controls operations of the shell motor 160 and the sphere drive 163 (or motors) in order to move the ballbot 104 along the operating surface 108 of the transit vehicle 102.

As noted throughout, the ballbot 104 is configured to self-stabilize due to a variety of forces that may be exerted against the ballbot 104. These forces can be generated through movement of the ballbot 104 in a static environment. An example of a static environment could include a floor in a building. In these instances, forces are produced from movement of the ballbot 104 and placement of objects onto the delivery platform 134 of the ballbot 104. Gravity is also acting on the ballbot 104 and can enhance the forces acting upon the ballbot 104 from its movement or loads the ballbot 104 carries.

To be sure, movement of the ballbot 104 induces a change in a center of mass $M_C$ of the ballbot 104. When the ballbot 104 is in a stabilized configuration, the center of mass $M_C$ is vertically aligned with a contact point 164, which is the point at which the sphere 156 contacts the operating surface 108. When the center of mass $M_C$ shifts away from its vertically aligned, stabilized location, torque forces act upon the ballbot 104, causing the ballbot 104 to tip. This tipping could result in the objects falling off of the delivery platform 134 or the ballbot 104 tipping over onto the operating surface 108. When the center of mass $M_C$ shifts, gravity further pulls the center of mass $M_C$ downwardly towards the operating surface 108. As alluded to above, when the operating surface 108 is uneven and the ballbot 104 moves on a sloped portion of the operating surface 108, this also induces shifting of the center of mass $M_C$ of the ballbot 104. Thus, an additional destabilization component that can enhance forces exerted on the ballbot 104 includes a slope S of the operating surface 108. It will be understood that the slope S of the operating surface 108 can include when the operating surface 108 is irregularly shaped rather than flat or when the operating surface 108 is angled due to a pitch of the transit vehicle 102, as will be discussed in greater detail with reference to FIGS. 6A-6C.

In some embodiments, a shift in the center of mass $M_C$ of the ballbot 104 is a function of any combination of the transit vehicle force components, the delivery platform force components, the device motion forces due to motion of the device, the gravity force on the device, the transit vehicle slope, the slope of the operating surface, and the orientation of the device.

In some embodiments, a location of the center of mass $M_C$ of the ballbot 104 is determined by motor babbling. The center of mass $M_C$ of the ballbot 104 may change when objects are added or removed from the delivery platform 134. Specific aspects of motor babbling would be known to one of ordinary skill in the art.

Broadly speaking, the ballbot controller 162 is configured to provide both stability and navigation signals for the ballbot 104. In general, the ballbot controller 162 computes forces acting on the ballbot 104 at the contact point 164 and counteracts/balances the forces by selective operation of at least one of the ballast assembly 136 and/or the translation assembly 140, or both in combination.

In some instances, such as when the operating surface 108 is flat, this balancing includes vertical realignment of the center of mass $M_C$ of the ballbot 104 and the contact point 164 of the sphere 156. When the operating surface 108 has a slope S, the central axis $C_A$ of the ballbot 104 is positioned at an offset $\alpha$ relative to the contact point 164 of the sphere 156.

Turning back to discussing slope computations, the ballbot 104 can use range-finding capabilities of the color video camera 151 of the ballbot vision system 148 and the processor 152 of the ballbot vision system 148 to detect a change in slope $\Delta$ of the operating surface 108.

In more detail, an image of the operating surface 108 is sampled by the video camera 151 in pixels, each with its own range to a part of the operating surface 108. The relative range of the pixels can be used to determine the slope of the operating surface 108. Horizontal movement of the ballbot 104 with respect to the operating surface 108 can be determined using optical flow or phase-based motion detection— just as an example. Changing range for the operating surface 108 can also be tracked to determine if an angle between the ballbot 104 and the operating surface 108 is changing.

The slope S disclosed above relates specifically to surface irregularities of the operating surface 108. Another type of slope, referred to as an operating surface gradient, can also be calculated. Specific details on how the ballbot 104 counteracts forces caused by changes in operating surface gradients are disclosed in greater detail with reference to FIGS. 7A-7C. Notwithstanding, one advantage of the self-stabilization aspects of the ballbot 104 is ensuring that the object(s) on the delivery platform 134 remain in contact with the delivery platform 134 during motion of the ballbot 104 and/or the transit vehicle 102.

According to some embodiments, in addition to the forces disclosed above, other forces may be exerted upon the ballbot 104 when the ballbot 104 is operating in a dynamic environment, such as when the transit vehicle 102 is in operation. Thus, in addition to counteracting the forces on the ballbot 104 due to the slope S of the operating surface 108, gravity, and the motion of the ballbot 104, a set of forces applied to the ballbot 104 due to transit vehicle movement are also included in the stabilization computations performed by the ballbot controller 162.

Figure 2B:
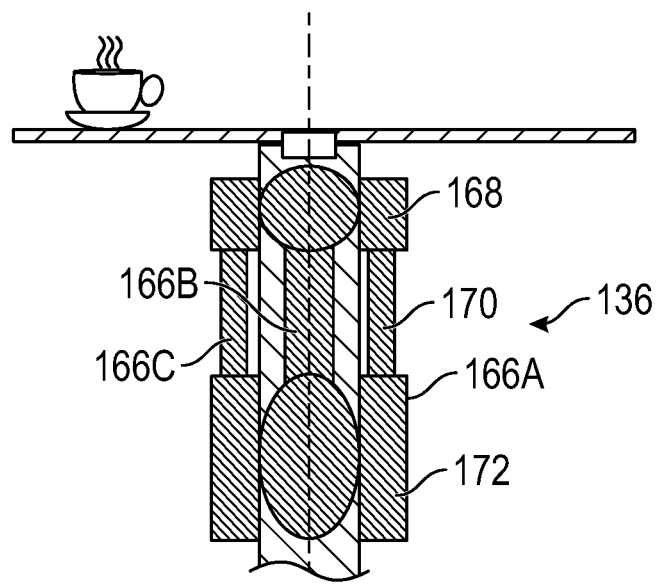
FIGS. 2B and 2C depict operation of a ballast assembly of an example ballbot of the present disclosure.
Figure 2C:
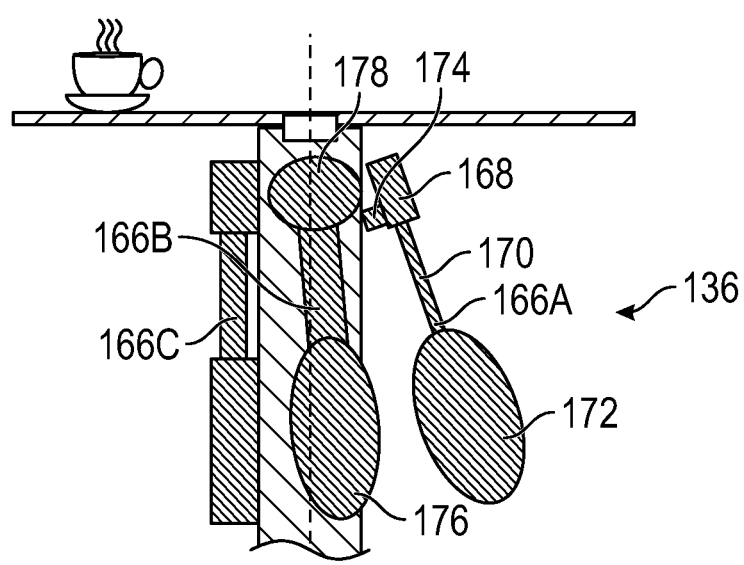

FIGS. 2B-2C collectively illustrate the ballast assembly 136 in greater detail. In FIG. 2B, the ballbot 104 is illustrated with the ballast assembly 136 in a neutral configuration. FIG. 2C illustrates the ballast assembly 136 in an active position in order to counteract forces applied to the ballbot 104.

In some embodiments, the ballast assembly 136 comprises a plurality of ballasts such as ballasts 166A-166C. Additional or fewer ballasts than those shown are also likewise contemplated for use. In general, each of the ballasts such as ballast 166A comprises a hub 168, a body 170, and a mass 172. The hub 168 is both rotationally and hingedly coupled to the body member 138 of the ballbot 104 using an actuator 174. Thus, each ballast has two possible ranges of motion. Ballast 166A is illustrated to show a range of motion that includes a pivot or a hinge where an angle is created between the ballast 166A and the body member 138 by movement of the ballast 166A upwardly and outwardly from the body member 138. The ballast 166B illustrates the other potential range of motion, which includes a pendulum-type motion where a mass 176 rotates around a hub 178 that is connected to the body member 138 of the ballbot 104 using an actuator that is similar or identical to the actuator 174 of the ballast 166A. In some instances, an actuator of a ballast can both rotate and hinge an associated mass at the same time. The movements of the ballasts 166A-166C are coordinated and actuated by the ballbot controller 162 (see FIG. 2A) to stabilize the ballbot 104 when destabilizing forces are acting against the ballbot 104. As noted throughout, actuation of the ballast assembly 136 to shift ballast masses can be performed in combination with actuation of the translation assembly 140 (see FIG. 2A) in some instances.

Figure 3:
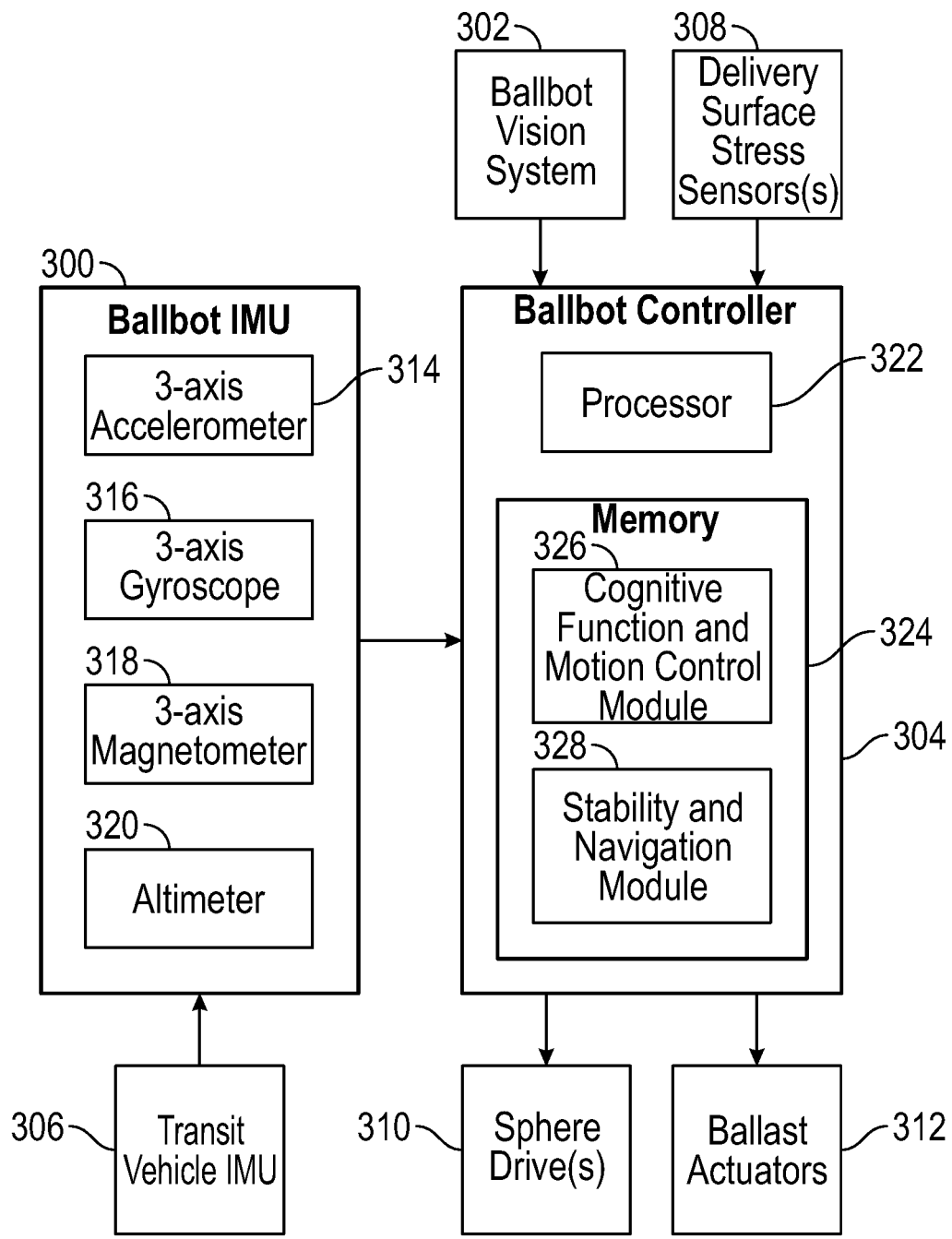
FIG. 3 is a schematic diagram of an example ballbot of the present disclosure.

FIG. 3 is a diagram of the sensing, control, and logic components of the ballbot 104. The ballbot 104 comprises a ballbot IMU 300, a ballbot vision system 302 (which corresponds to the ballbot vision system 148 of FIG. 2A), and a ballbot controller 304, which is identical to the ballbot controller 162 of FIG. 2A, but is illustrated in FIG. 3 schematically. A transit vehicle IMU 306 and a delivery surface stress sensor 308 (which corresponds to the stress sensor 146 of FIG. 2A) each provide the ballbot controller 304 with signals indicative of forces produced by the transit vehicle and delivery platform, respectively. The ballbot controller 304 is configured to control the sphere drive(s) 310 and the ballast actuator(s) 312 to stabilize the ballbot 104 based on input received from the ballbot IMU 300, the ballbot vision system 302, and the delivery surface stress sensor 308.

The ballbot IMU 300 can comprise a 3-axis accelerometer 314, a 3-axis gyroscope 316, a 3-axis magnetometer 318, and an altimeter 320. In general, the ballbot IMU 300 senses forces that act on the ballbot based on the motion of the ballbot. The ballbot IMU 300 can also integrate transit vehicle forces as well.

The ballbot vision system 302 corresponds to the ballbot vision system 148 of FIG. 2A, and as with the ballbot vision system 148 comprises the camera 151 and the processor 152. The processor 152 is generally configured to perform operations such as reading fiduciary objects, assessing operating surface slope, and calculating the motion of the ballbot based off of images and/or video obtained through the camera 151. In some embodiments, the ballbot vision system 302 can comprise memory for storing executable instructions for performing any of these operations.

The ballbot controller 304 generally comprises a processor 322 and a memory 324. In some embodiments, the memory 324 of the ballbot controller 304 stores a cognitive function and motion control module 326 and a stability and navigation module 328. Cooperatively, the cognitive function and motion control module 326 and the stability and navigation module 328 include logic that can be executed by the processor 322 to sense destabilization of the ballbot 104 and to provide signals to the sphere drive(s) 310 and the ballast actuator(s) 312 in order to self-stabilize the ballbot 104. Specific details on how the ballbot controller 304 senses destabilization of the ballbot 104 and compensates for the destabilization are disclosed in greater detail herein.

Figure 4:
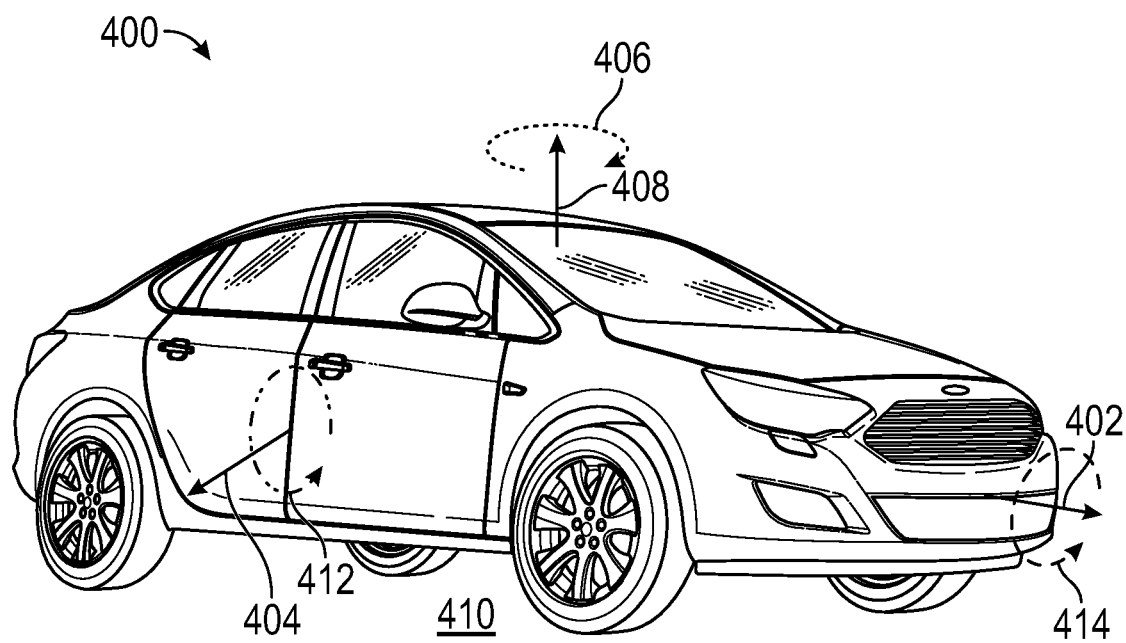
FIG. 4 depicts various forces that can act on a transit vehicle disclosed herein.

FIGS. 4-8B collectively illustrate transit vehicle forces that can contribute to destabilization of a ballbot of the present disclosure when the ballbot is operating in a transit vehicle. For example, FIG. 4 illustrates various forces created by movement of a transit vehicle 400. In general, each of these forces can be quantified as a change in acceleration in one or more directions (multi-directional changes in force are generally referred to as torque). The transit vehicle 400 can be subject to linear forces such as a linear longitudinal force 402 and a linear lateral force 404. The linear longitudinal force 402 can act alone during forward movement of the transit vehicle 400. A yaw force 406 is created when the transit vehicle 400 is turning and is a reaction to yaw acceleration of the vehicle. Additional details regarding the yaw force 406 are illustrated and described with reference to FIGS. 7A-7B. A heave force 408 is a lift force created when the transit vehicle 400 moves upwardly relative to the road 410. In general, heave is a rate of change in a ride height of a transit vehicle averaged across all four wheels coupled with a rate of elevation change on a road. These forces are measured using a transit vehicle IMU (see FIG. 1). Additional details regarding the heave force 408 are illustrated and described with reference to FIGS. 5A-5B.

In general, references to the term "linear" will be understood in context. Linear forces are approximately linear within a limited time interval. Therefore the logical model that controls ballbot stability is quasi-static, computing a ball movement based on current inputs and then recomputing as inputs change.

A pitch force 412 is a rotational force created when the transit vehicle 400 operates on a sloped surface, such as when the road 410 is sloped at an angle measured relative to the linear lateral force 404. Additional details regarding the pitch force 412 are illustrated and described with reference to FIGS. 6A-6C. A roll force 414 is a rotational force created when the transit vehicle 400 operates on a sloped surface, such as when the road 410 is sloped at an angle measured relative to the linear longitudinal force 402. The roll force 414 acts orthogonally to the pitch force 412. To be sure, the roll force 414 and the pitch force 412 can act in combination when the road 410 is both sloped and pitched. Indeed, any combination (including all) of these transit vehicle forces can be generated at the same time based on the movement of the transit vehicle 400.

Figure 5A:
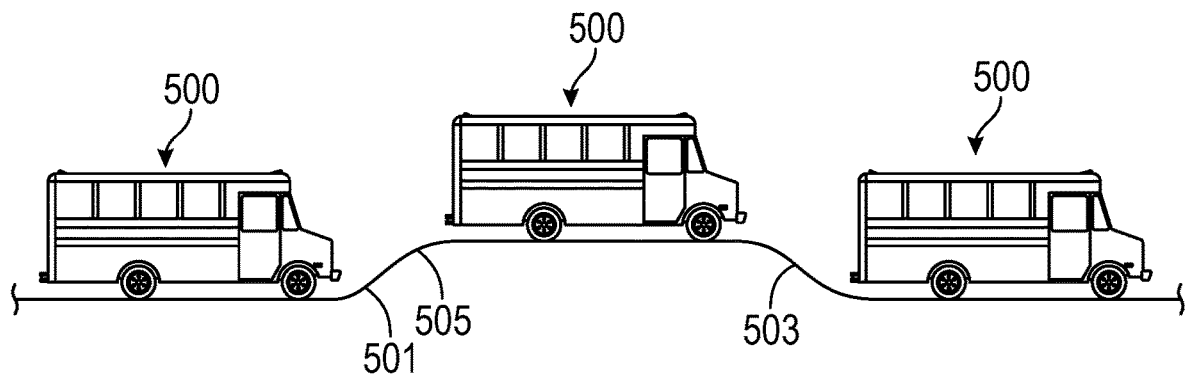
FIGS. 5A-5B collectively illustrate heave forces and responses thereto by a ballbot of the present disclosure.
Figure 5B:
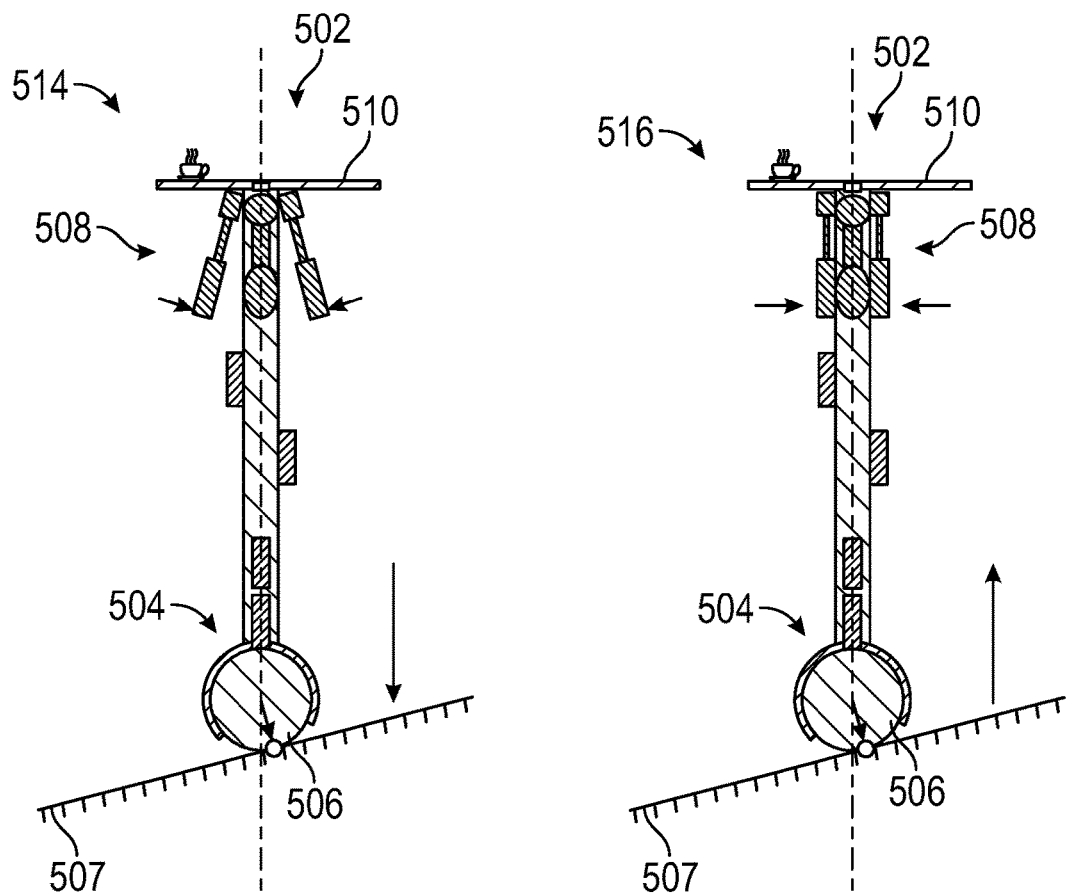

FIGS. 5A and 5B, with reference to FIG. 3, collectively illustrate the behavior of an example transit vehicle 500 and a ballbot 502 operating inside of the transit vehicle 500 in response to an applied heave force. To be sure, positive heave is the component of movement in which all four wheels move up together, whereas negative heave is the component of movement in which all four wheels move down together. An area 501 that would create positive heave includes a section of a road 505 with a positive slope, whereas an area 503 that would create negative heave includes a section of the road 505 with a negative slope.

It will be understood that the heave of the transit vehicle 500 may cause a translation unit 504 of the ballbot 502, and specifically its sphere 506, to bounce and lose contact with an operating surface 507 of the transit vehicle 500. This lack of contact may cause a loss in traction and stability when the heave switches from positive to negative. To counteract this problem, a future change in heave is predicted based on vehicle IMU input received by the ballbot 502. In advance of the switch from positive to negative heave, the ballbot controller 304 activates actuators to lower the ballasts of a ballast assembly 508 and raises the ballasts when the ballbot IMU 300 (and specifically the 3-axis accelerometer thereof) on the ballbot 502 detects negative heave. Additional details on predicting vehicle heave are disclosed in U.S. Pat. No. 8,788,145, titled "Adaptive active suspension system with road preview" which is hereby incorporated by reference herein in its entirety including all references and appendices cited therein for all purposes. For purposes of clarity and brevity, the disclosure of the '145 patent is referred to herein as the "vehicle NVH model."

In some embodiments, the stress sensor 308 of the ballbot 502 can detect a change in a normal force on the delivery platform 510 that is indicative of an arrival of a heave signal. As illustrated in FIG. 5B, and specifically in view 514 when the change in normal force is detected by the stress sensor 308, the ballbot controller 304 actuates the ballasts (by hingedly raising the masses), which produces a down-thrust force that counteracts a change in heave force from positive to negative. Conversely, in view 516, the ballbot controller 304 actuates the ballasts (by hingedly lowering the masses), which produces a upward-thrust force that counteracts a change in heave force from negative to positive.

Figure 6A:
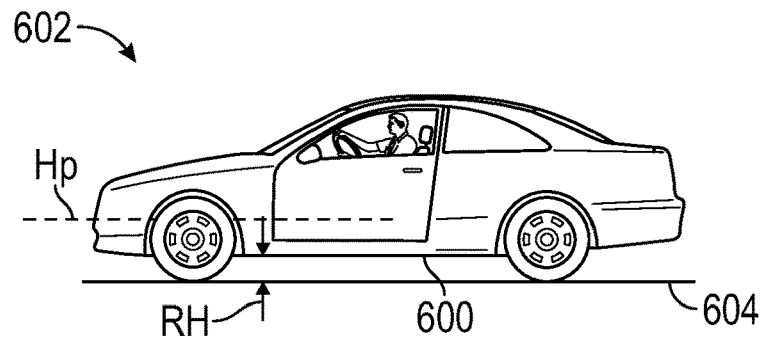
FIGS. 6A-6C collectively illustrate pitch and roll forces and responses thereto by a ballbot of the present disclosure.
Figure 6B:
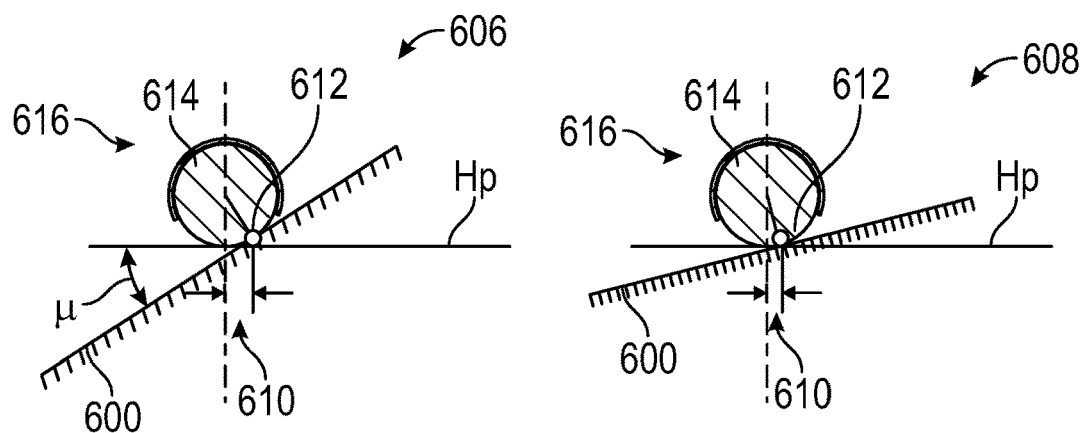
Figure 6C:
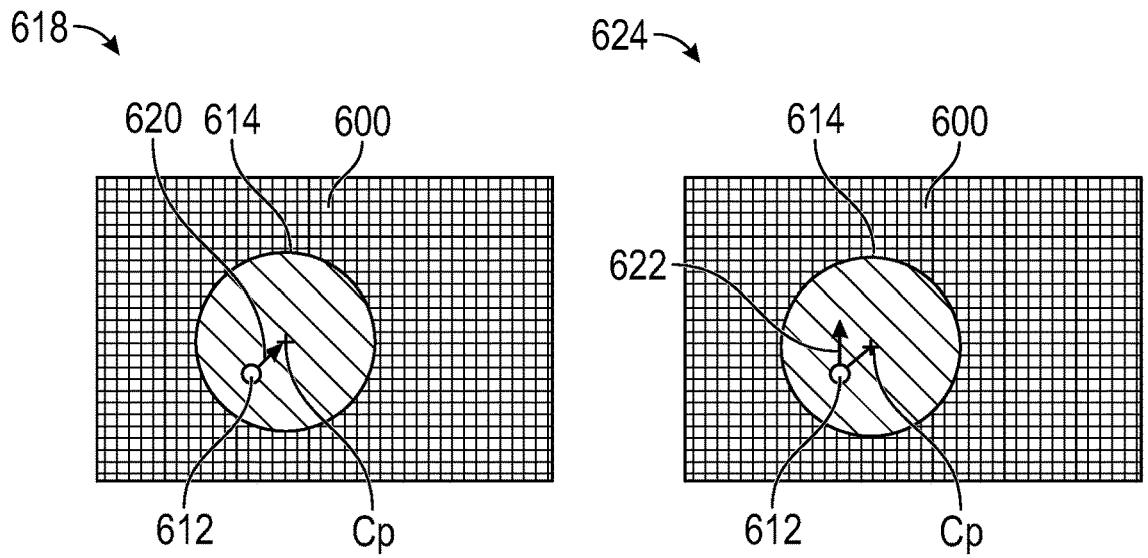

FIGS. 6A-6C, with reference to FIG. 3, collectively illustrate pitch and roll forces which result in a change in gradient in the operating surface of a transit vehicle in which a ballbot is operating. This change in operating surface gradient is due to a transit vehicle 602 encountering road 604 slope/pitch changes such as driving on inclined roads. It will be understood that roll and pitch forces combine to produce an operating surface gradient. Broadly speaking, the operating surface gradient is a directional derivative measured between an operating surface 600 and a horizontal plane. The horizontal plane is roughly parallel with the road 604 when the road 604 is not inclined. A side view of the horizontal plane is illustrated in FIG. 6A as a reference line $H_P$. More specifically, the operating surface gradient $S_G$ is a function of an unloaded floor gradient of the transit vehicle 602 (which corresponds to the horizontal plane), a dynamic ride height $R_H$ of the transit vehicle 602, coupled with changes in the slope of the road by the transit vehicle NVH model. The operating surface gradient $S_G$ can be measured as the angle μ between the reference line $H_P$ and a current position of the operating surface 600.

FIG. 6B illustrates a change in slope of the operating surface 600 due to a change in slope/pitch of a road 604 (see FIG. 6A) between views 606 and 608 which causes a change in the operating surface 600 relative to the reference line $H_P$. Generally, view 606 illustrates a large change in the operating surface gradient $S_G$, and view 608 illustrates a large change in the operating surface gradient $S_G$ relative to view 606. In some embodiments, a large change in the operating surface gradient $S_G$ produces a concomitant offset 610 between a contact point 612 of a sphere 614 of a translation unit 616 of a ballbot and an operating surface 600. To be sure, the offset 610 can be measured as a distance between a central axis $C_A$ operational of the ballbot and the contact point 612 of the sphere 614.

FIG. 6C is a top down view of the sphere 614 and the contact point 612 on the operating surface 600 illustrating an interplay between contact point offsets and floor gradients. A centerpoint $C_P$ of the sphere 614 is illustrated for reference. View 618 illustrates a stable condition for the ballbot. The contact point 612 is illustrated and a gradient line 620 is illustrated as extending between the centerpoint $C_P$ and the contact point 612. For context, the gradient line 620 points downslope and its length conveys a steepness of the slope (e.g., magnitude of the gradient). In this illustration, the length is scaled such that the gradient line 620 reaches the centerpoint $C_P$ when the contact point 612 is stable. View 624 illustrates an unstable condition for the ballbot. An unstable condition occurs immediately after a floor gradient changes and before the ballbot controller 304 rotates the sphere 614 and moves one or more of the ballasts of a ballast assembly (not shown in this view, but can be seen in FIG. 2 and/or FIGS. 5A-5B) to stabilize the ballbot. For illustrative purposes, a torque is created when a gradient line 622 is longer or shorter than a distance between the centerpoint $C_P$ and the contact point 612.

In sum, to counteract changes in the offset due to changes in the floor gradient, such as a change in offset between FIG. 6B views 606 and 608, the ballbot controller 304 can either move the sphere 614 or one or more of the ballasts of a ballast assembly to shift a center of gravity (see FIG. 1) to counteract this change in contact point offset. The overall objective of the ballbot controller 304 is to balance all destabilizing forces acting at the contact point 612 of the ballbot.

Figure 7A:
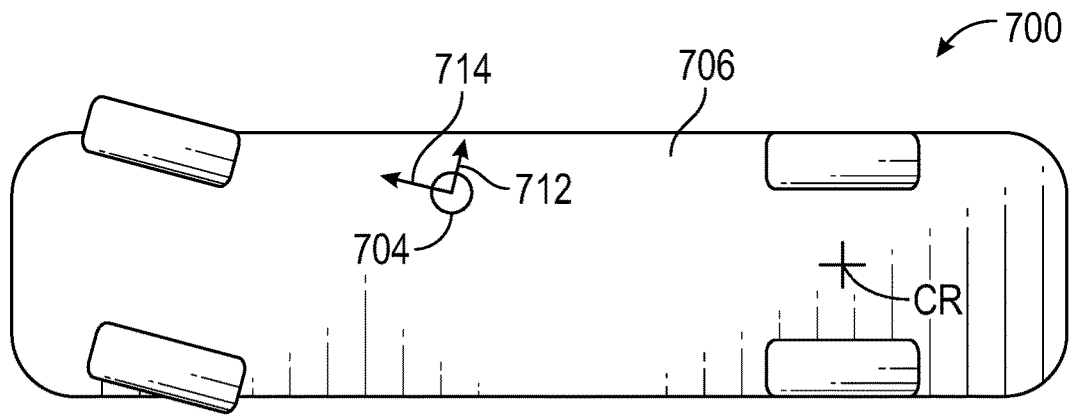
FIGS. 7A-7B collectively illustrate yaw force and yaw acceleration and responses thereto by a ballbot of the present disclosure.
Figure 7B:
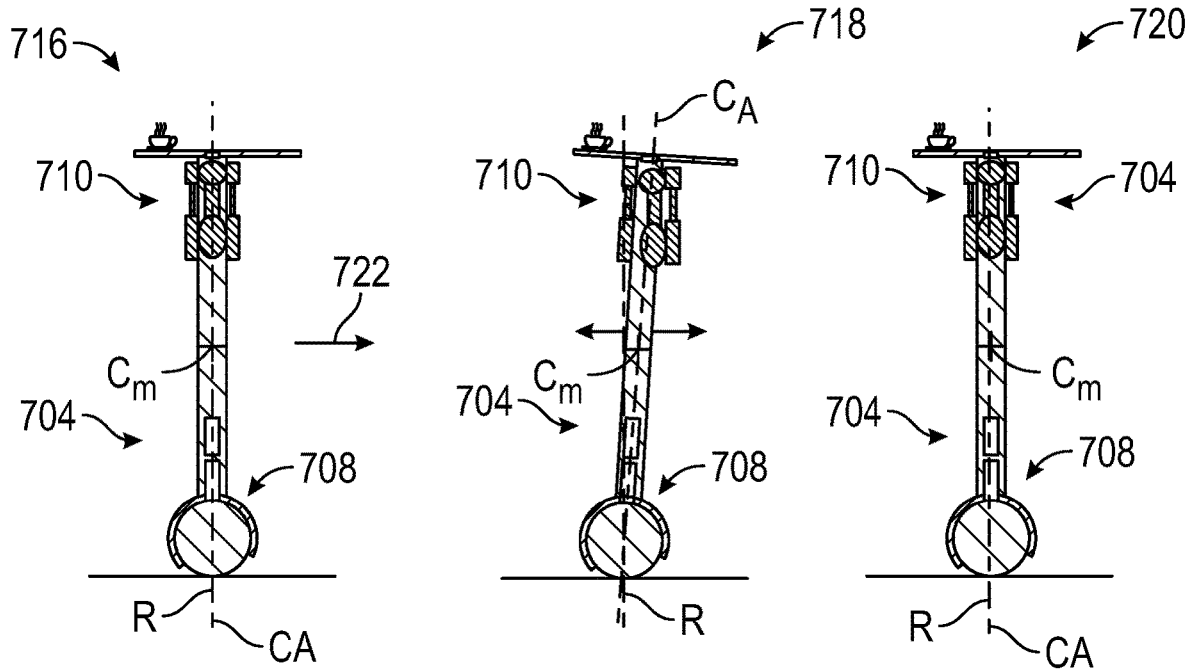

FIGS. 7A-7B, with reference to FIG. 3, collectively illustrate forces such as yaw rate and yaw acceleration during vehicle rotation, their effects on a ballbot operating within the transit vehicle, and self-stabilization of the ballbot in response to these forces. An example transit vehicle 700 and ballbot 704 are illustrated in FIG. 7A. The transit vehicle 700 comprises an operating surface 706 and a center of rotation $C_R$.

As noted above, a yaw force is derived from a rotational acceleration of the vehicle around a turning point. On front steer vehicles this point is midway between the two rear wheels. On four wheel steer vehicles it can change dynamically.

The ballbot controller 304 computes these accelerations and selectively controls any of a translation assembly 708 and/or a ballast assembly 710 of the ballbot 704 to balance or counteract these forces as illustrated in FIG. 7B.

In general, the transit vehicle 700 in FIG. 7A is illustrated as performing a turning operation. Based on a location of the ballbot 704 on the operating surface 706 of the transit vehicle 700, a lateral acceleration force is also exerted on the ballbot 704. The centrifugal force is a function of a mass of the ballbot, a radius (distance between the ballbot 704 and the center of rotation $C_R$), and a yaw rate of the transit vehicle 700. To be sure, the yaw rate is a change in yaw acceleration that includes both linear 712 and longitudinal 714 acceleration components.

Views 716-720 respectively illustrate self-stabilization of the ballbot 704 in response to a change in yaw rate. In view 716, the central axis $C_A$ of the ballbot 704 is in alignment with a reference line R that is substantially orthogonal to the operating surface 706 of the transit vehicle 700. A yaw rate change is indicated by arrow 722 that acts on the ballbot 704.

In view 718, the ballbot controller 304 selectively controls operations of the translation assembly 708 and/or a ballast assembly 710 in view 718 to counteract a shift in the center of mass $M_C$ and the central axis $C_A$ of the ballbot 704 away from the reference line R. This shifting causes instability of the ballbot 704. View 720 illustrates a return to vertical alignment of the center of mass $M_C$ and the central axis $C_A$ with the reference line R, which is indicative of forces being balanced for the ballbot 704 and the ballbot 704 having self-stabilized.

Figure 8A:
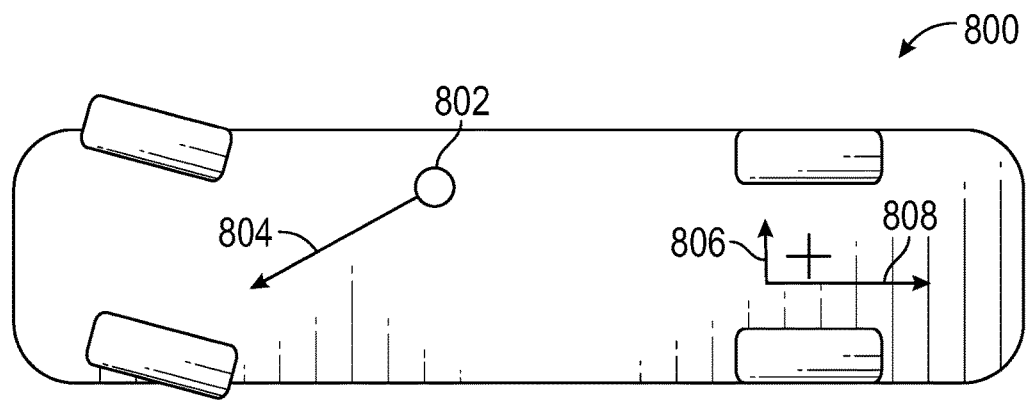
FIGS. 8A-8B collectively illustrate horizontal force and responses thereto by a ballbot of the present disclosure.
Figure 8B:
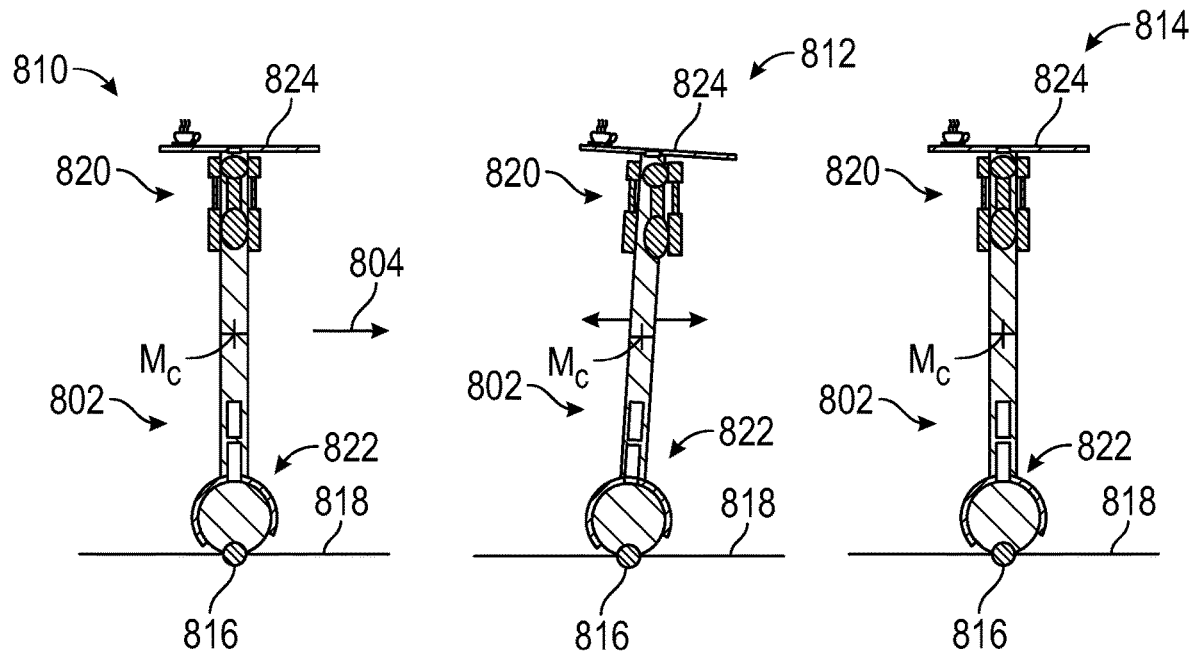

FIGS. 8A-8B, in view of FIG. 3, collectively illustrate horizontal acceleration during rotation of a transit vehicle 800 when turning, the effect of horizontal acceleration on a ballbot 802 operating within the transit vehicle 800, and self-stabilization of the ballbot 802 in response to horizontal acceleration of the transit vehicle 800.

It will be understood that horizontal acceleration 804 (shown as an arrow) is a function of lateral acceleration 806 and longitudinal acceleration 808. To be sure, horizontal acceleration 804 is an inverse vector sum of both the lateral and longitudinal acceleration forces. The horizontal acceleration 804 will act against the ballbot 802 and will destabilize the ballbot 802. As illustrated in views 810-814 of FIG. 8B, the horizontal acceleration 804 of the transit vehicle 800 will act on a center of mass $M_C$ and create a torque force at a contact point 816 between the ballbot 802 and an operating surface 818 of the transit vehicle 800. The ballbot 802 is in a destabilized position in view 812.

Again, the horizontal acceleration 804 can either be sensed by the ballbot IMU 300 or can be received by the ballbot 802 from a transit vehicle IMU. In response, the ballbot controller 304 will selectively adjust either or both of a ballast assembly 820 and a translation assembly 822 in order to balance the torque at the contact point 816 and counteract any corresponding shift in the center of mass $M_C$ of the ballbot 802. This force balancing returns the ballbot 802 to an upright and self-stabilized position as illustrated in view 814.

As noted above, a location of the center of mass $M_C$ of the ballbot 802 is determined by motor babbling. The center of mass $M_C$ of the ballbot 802 may change when objects are added or removed from the delivery platform such as delivery platform 824.

Taken together, the ballbot controller can be configured to receive any of the transit vehicle forces depicted and described in FIGS. 4-8B, can compute forces exerted at a contact point between a ballbot and an operating surface of the transit vehicle due to these transit vehicle forces, and can balance the transit vehicle forces in order to self-stabilize the ballbot.

To reduce complexity in ballbot controller computations, a ballbot controller can be configured to cause a ballbot to hold a current position when the ballbot itself senses or receives transit vehicle force information from a transit vehicle IMU that indicates a transit vehicle force is expected or is currently occurring. This simplifies calculations for the ballbot controller because no ballbot motion forces are produced by motion of the ballbot at the same time as the transit vehicle is in motion. The ballbot controller would permit movement once the transit vehicle forces cease. In some embodiments, the ballbot controller 304 can instantiate this pause or hold only when the transit vehicle forces meet or exceed (or are expected to exceed) a transit vehicle forces threshold(s).

Otherwise, in other embodiments, the ballbot controller allows the ballbot to move when the ballbot is experiencing transit vehicle forces. In these embodiments, the ballbot controller must not only account for changes in transit vehicle forces but also the relative motion of the ballbot as it traverses around the transit vehicle. The cooperative evaluation of both ballbot motion and transit vehicle is disclosed in greater detail with respect to FIG. 9.

Illustrative Processes

Figure 9:
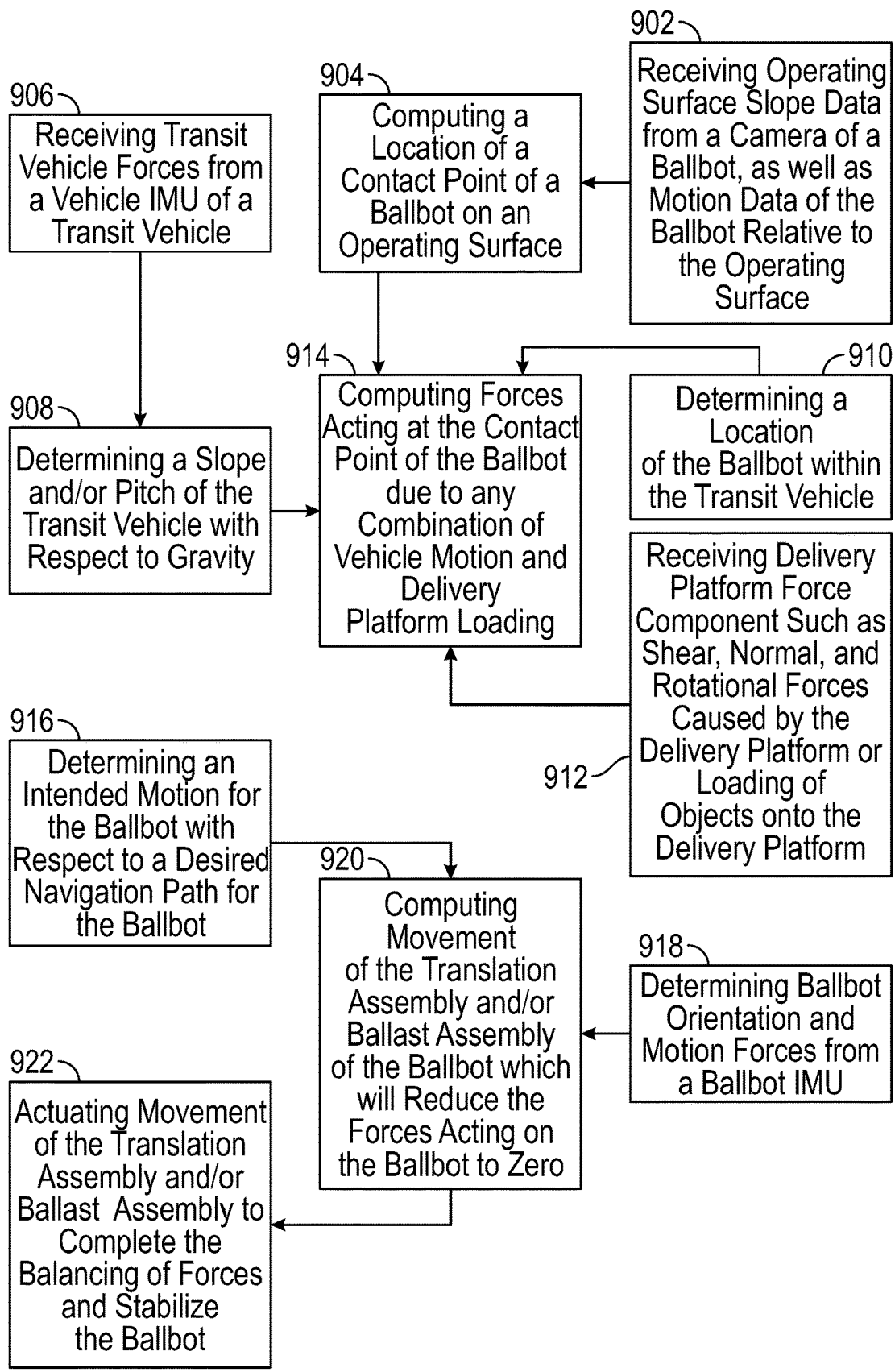
FIG. 9 is a flowchart of an example method of the present disclosure.
Figure 10:
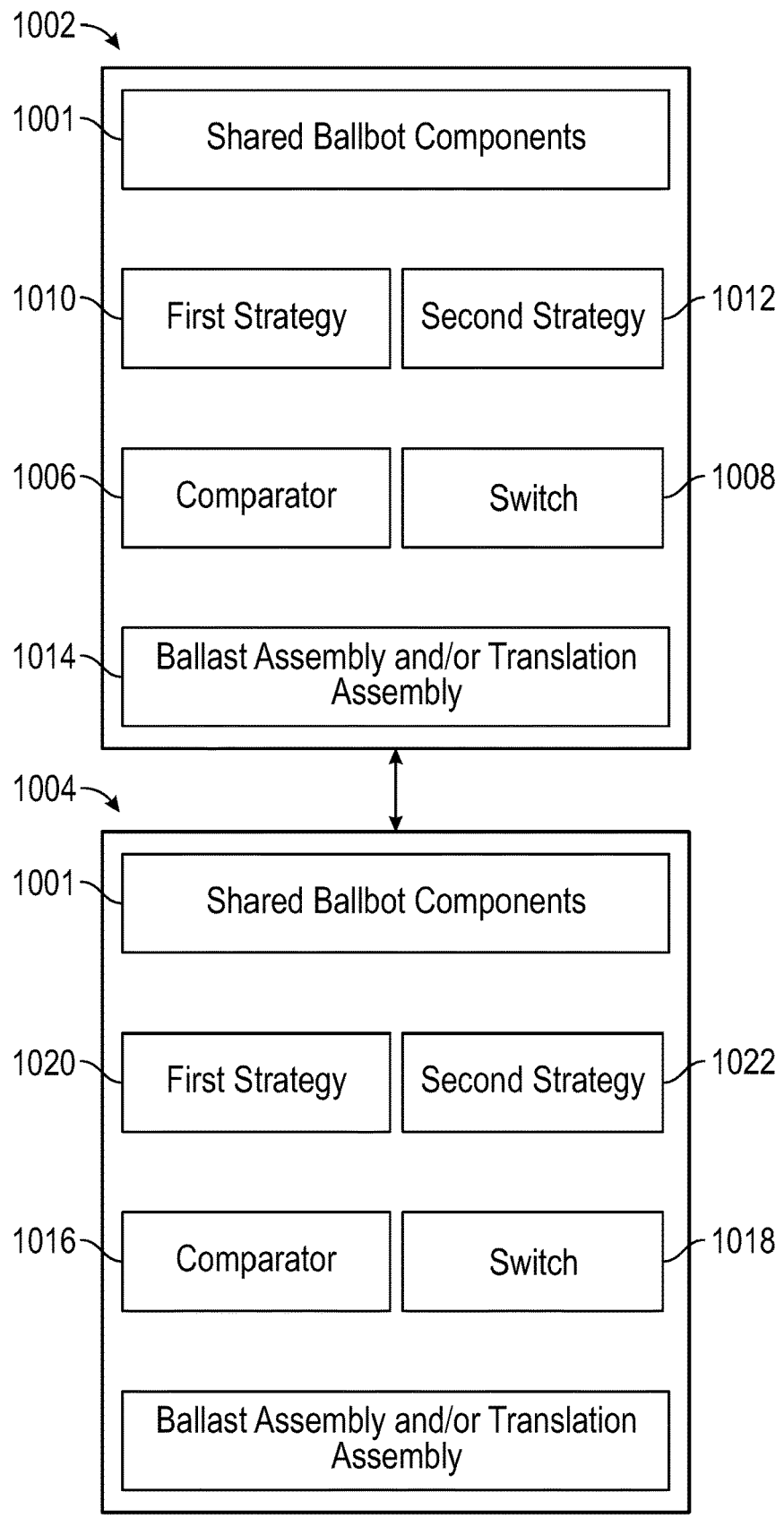
FIG. 10 schematically illustrates two example ballbots of the present disclosure that are configured to imitate self-stabilization behaviors.

FIGS. 9-10 illustrate example flow diagrams showing processes for controlling movement of a device (e.g., navigation and self-stabilization) such as a ballbot within a transit vehicle, as described above. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 9 is a flowchart of an example process for effecting self-stabilization of a ballbot. The method is performed by the ballbot controller 304 (see FIG. 3) and generally includes a step 902 of receiving operating surface slope data from a camera of a ballbot, as well as motion data of the ballbot relative to the operating surface. Using the slope and motion data of the ballbot relative to the operating surface, the method includes a step 904 of computing a location of a contact point of a ballbot on an operating surface.

In one or more embodiments, the method includes a step 906 of receiving transit vehicle forces from a vehicle IMU of a transit vehicle. Using the transit vehicle forces, the method includes a step 908 of determining a slope and/or pitch of the transit vehicle with respect to gravity. In some embodiments, the method includes a step 910 of determining a location of the ballbot within the transit vehicle, as well as a step 912 of receiving delivery platform force components such as shear, normal, and rotational forces caused by the delivery platform or loading of objects onto the delivery platform. The location of the ballbot within the transit vehicle can be used to calculate forces such as yaw rate, yaw acceleration, and horizontal force using the transit vehicle forces received in step 908. Step 914 includes computing forces acting at the contact point of the ballbot due to any combination of vehicle motion and delivery platform loading.

Next, the method includes a step 916 of determining an intended motion for the ballbot with respect to a desired navigation path for the ballbot. In step 918, the method includes determining ballbot orientation and motion forces from a ballbot IMU.

Step 920 utilizes the forces computed in step 914 caused by vehicle motion in combination with the ballbot orientation and motion forces calculated in step 918 and the intended motion for the ballbot in step 916 in order to compute movement of the translation assembly and/or ballast assembly of the ballbot which will reduce the forces acting on the ballbot to zero. Again, this can include compensating for a shift in the center of mass of a ballbot caused by the relative motion of the transit vehicle, the ballbot, and the delivery platform loading. When the desired movement of the translation assembly and/or the ballast assembly is determined, the method includes a step 922 of actuating movement of the translation assembly and/or the ballast assembly to complete the balancing of forces and stabilize the ballbot. The mechanisms for actuating the movement of the translation assembly and/or the ballast assembly are illustrated in FIG. 3.

Movement of the ballast assembly can comprise causing at least one of pivoting or hinging of one or more of a plurality of ballasts in order to balance the forces exerted on the device. Directional movement of the translation assembly, including rotating a shell and/or a sphere of the translation assembly can also be utilized to produce the desired balancing of forces that will stabilize the ballbot. Moreover, the translation assembly is used to move the ballbot through the transit vehicle. In some embodiments, this movement is accomplished by reading data encoded into the fiduciary objects for navigating the ballbot on the operating surface, as well as selectively controlling the translation assembly to perform the desired navigation.

With respect to navigation and intended movement of the ballbot, in some embodiments, the method includes a step of sensing any of identification, location, and orientation of fiduciary objects on the operating surface. This can occur using image processing of video/images captured by a camera mounted on the ballbot. In some embodiments, the ballbot navigates through the transit vehicle using the fiduciary objects. The ballbot can perform specific routing between adjacent fiduciary objects in some embodiments.

In one example, a first fiduciary object can encode data that instructs the ballbot with data that allows the ballbot to translate to a second, adjacent fiduciary object. In more detail, a ballbot controller is configured to utilize an intended motion of the ballbot during navigation and the orientation of the ballbot to further control the selective movement of one or more of the plurality of ballasts of a ballast assembly or directional movement of the translation assembly.

As noted above, the ballbot can receive transit vehicle force components from signals provided by vehicle force sensors, as well as suspension signals and steering signals of the transit vehicle, according to the vehicle NVH model referenced herein.

FIG. 10 is a schematic diagram that illustrates two ballbots 1002 and 1004, which are configured to iteratively learn self-stabilization behaviors from one another through imitation. Two example ballbots are illustrated in FIG. 1, such as ballbot 104 and ballbot 105. Each of the ballbots 1002 and 1004 includes the components of the ballbot 104 of FIG. 3, generally illustrated as shared ballbot components 1001 such as the ballbot IMU, the ballbot controller, the sensors, the actuators, and so forth.

While two ballbots are illustrated, it will be understood that any number of ballbots can learn self-stabilization behaviors from one another through imitation. Additionally, in order to implement imitation and self-stabilization behaviors, the ballbot 1002 can include a comparator 1006 and a switch 1008 that selectively choose between one of two possible self-stabilization behavior strategies 1010 and 1012, respectively. The first self-stabilization behavior strategy 1010 includes a self-stabilization behavior received from the ballbot 1004. The second self-stabilization behavior strategy 1012 includes a self-stabilization behavior that originates from the ballbot 1002. The ballast assembly and/or translation assembly 1014 of the ballbot 1002 are controlled based on a selection made by the comparator 1006. The selection includes a choice between self-stabilization behavior strategies 1010 and 1012. In some embodiments, the ballbot 1002 can overwrite the self-stabilization behavior strategy 1012 with self-stabilization behavior strategy 1010 when the comparator 1006 determines that the self-stabilization behavior strategy 1010 is more effective than the self-stabilization behavior strategy 1012.

Ballbot 1004 is likewise provided with a comparator 1016 and a switch 1018 that selectively choose between one of two possible self-stabilization behavior strategies 1020 and 1022, respectively. The first self-stabilization behavior strategy 1020 includes a self-stabilization behavior received from the ballbot 1002. The second self-stabilization behavior strategy 1022 includes a self-stabilization behavior that originates from the ballbot 1004. The second ballbot 105 also includes a ballast assembly and/or translation assembly that is/are controlled using one of the selected self-stabilization behavior strategies.

Example Embodiments

In some instances, the following examples may be implemented together or separately by the systems and methods described herein.

Example 1 may include a device, comprising: a body member having a central axis extending therethrough, the body member having a first end and a second end; a delivery platform disposed on the first end of the body member and orthogonal to the central axis; a translation assembly disposed on the second end of the body member providing for movement of the device; a ballast assembly; and a controller that is configured to control operation of at least one of the translation assembly or the ballast assembly so as to balance forces exerted on the device and maintain the delivery platform in a desired orientation as the device moves across an operating surface.

Example 2 may include the device of example 1, further comprising one or more delivery platform sensors that are configured to measure delivery platform forces comprising at least one of shear, normal, or torque forces applied to the delivery platform by one or more objects placed onto the delivery platform.

Example 3 may include the device according to example 2 and/or some other example herein, further comprising a camera that is configured to capture camera input comprising at least one of: a slope of the operating surface that is contacted by the translation assembly; movement of the translation assembly relative to the operating surface; or identification, location, and orientation of fiduciary objects on the operating surface.

Example 4 may include the device according to example 3 and/or some other example herein, further comprising an inertial measurement unit configured to measure the forces exerted on the device at a contact point where the translation assembly contacts the operating surface, wherein the forces exerted on the device comprise device motion forces due to motion of the device and gravity force.

Example 5 may include the device according to example 4 and/or some other example herein, wherein the inertial measurement unit is further configured to: sense an orientation of the device relative to vehicle coordinates when the device is operating within a transit vehicle; and receive a transit vehicle slope from the transit vehicle.

Example 6 may include the device according to example 5 and/or some other example herein, wherein the inertial measurement unit is further configured to receive transit vehicle force components that are indicative of forces of the transit vehicle provided by vehicle force sensors, as well as suspension signals and steering signals.

Example 7 may include the device according to example 6 and/or some other example herein, wherein balancing forces exerted on the device comprise compensating for a shift in a center of mass of the device, wherein the shift in the center of mass is a function of: the transit vehicle force components; the delivery platform force components; the device motion forces due to motion of the device; the gravity force on the device; the transit vehicle slope; the slope of the operating surface; and the orientation of the device.

Example 8 may include the device according to example 7 and/or some other example herein, wherein the ballast assembly comprises a plurality of ballasts that are each rotatably and hingedly coupled to the body member, and provide movement in two axes of motion relative to the body member, wherein the controller causes at least one of selective movement of one or more of the plurality of ballasts or directional movement of the translation assembly in order to produce the compensation for the shift of the center of mass of the device.

Example 9 may include the device according to example 8 and/or some other example herein, wherein the controller is further configured to: read data encoded into the fiduciary objects for navigating the device on the operating surface; and selectively control the translation assembly to perform the navigation.

Example 10 may include the device according to example 9 and/or some other example herein, wherein the controller is further configured to utilize an intended motion of the device during navigation, and the orientation of the device is computed by the inertial measurement unit to further control the selective movement of one or more of the plurality of ballasts or directional movement of the translation assembly.

Example 11 may include the device according to example 1 and/or some other example herein, wherein the desired orientation includes the delivery platform held at a position that prevents objects contacting an upper surface of the delivery platform from sliding off of the delivery platform when the device is in motion.

Example 12 may include a method, comprising: determining, by one or more processors coupled to at least one memory, a location of a contact point between a translation assembly of a ballbot and an operating surface of a transit vehicle; sensing a slope and movement of the ballbot on the operating surface using camera input from a camera; receiving transit vehicle force components for the transit vehicle; computing a slope of the operating surface with respect to gravity; sensing a location of the ballbot within the transit vehicle; determining forces on the ballbot at the contact point comprising any of the transit vehicle force components, the location of the contact point, the slope, the movement of the ballbot, the slope of the operating surface with respect to gravity, and the location of the contact point of the ballbot, or any combination thereof; and selectively controlling at least one of a ballast assembly and a translation assembly of the ballbot so as to balance the forces on the ballbot at the contact point.

Example 13 may include the method according to example 12, further comprising measuring delivery platform force components comprising at least one of shear, normal, or torque forces of a delivery platform of the ballbot.

Example 14 may include the method according to example 13 and/or some other example herein, wherein the ballbot further senses identification, location, and orientation of fiduciary objects on the operating surface.

Example 15 may include the method according to example 14 and/or some other example herein, wherein the ballbot navigates through the transit vehicle using the fiduciary objects.

Example 16 may include the method according to example 15 and/or some other example herein, further comprising sensing: an orientation of the ballbot relative to vehicle coordinates when the device is operating within a transit vehicle; and gravity and motion forces created by movement of the device along the operating surface.

Example 17 may include the method according to example 16 and/or some other example herein, further comprising receiving the transit vehicle force components from signals provided by vehicle force sensors, as well as suspension signals and steering signals of the transit vehicle.

Example 18 may include the method according to example 17 and/or some other example herein, further comprising causing at least one of pivoting or hinging of one or more of a plurality of ballasts or directional movement of the translation assembly in order to balance the forces exerted on the device.

Example 19 may include the method according to example 18 and/or some other example herein, further comprising: reading data encoded into the fiduciary objects for navigating the ballbot on the operating surface; selectively controlling the translation assembly to perform the navigation; and wherein the controller is further configured to utilize an intended motion of the ballbot during navigation and the orientation of the ballbot to further control the selective movement of one or more of the plurality of ballasts or the directional movement of the translation assembly.

Example 20 may include a system, comprising: a transit vehicle comprising an operating surface having one or more fiduciary objects positioned thereon; and a ballbot configured to move around the transit vehicle on the operating surface using the one or more fiduciary objects for navigation, wherein the ballbot transports at least one object placed on a delivery platform, the ballbot being configured to balance forces measured at a contact point between the ballbot and the operating surface, wherein the forces are caused by at least one of motion of the transit vehicle, motion of the ballbot, or gravity, wherein the ballbot balances the forces using at least one of a ballast assembly of the ballbot, a translation assembly of the ballbot, or a combination thereof, the forces being balanced so as to stabilize the ballbot and to prevent the at least one object from sliding off the delivery platform.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can,"

"could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A device, comprising:
    a body member having a central axis extending therethrough, the body member having a first end and a second end;
    a delivery platform disposed on the first end of the body member and orthogonal to the central axis;
    a translation assembly disposed on the second end of the body member providing for movement of the device;
    a ballast assembly; and
    a controller that is configured to control operation of at least one of the translation assembly or the ballast assembly so as to balance forces exerted on the device and maintain the delivery platform in a desired orientation as the device moves across an operating surface.

2. The device according to claim 1, further comprising one or more delivery platform sensors that are configured to measure delivery platform forces comprising at least one of shear, normal, or torque forces applied to the delivery platform by one or more objects placed onto the delivery platform.

3. The device according to claim 2, further comprising a camera that is configured to capture camera input comprising at least one of:
    a slope of the operating surface that is contacted by the translation assembly;
    movement of the translation assembly relative to the operating surface; or
    identification, location, and orientation of fiduciary objects on the operating surface.

4. The device according to claim 3, further comprising an inertial measurement unit configured to measure the forces exerted on the device at a contact point where the translation assembly contacts the operating surface, wherein the forces exerted on the device comprise device motion forces due to motion of the device and gravity force.

5. The device according to claim 4, wherein the inertial measurement unit is further configured to:
    sense an orientation of the device relative to vehicle coordinates when the device is operating within a transit vehicle; and
    receive a transit vehicle slope from the transit vehicle.

6. The device according to claim 5, wherein the inertial measurement unit is further configured to receive transit vehicle force components that are indicative of forces of the transit vehicle provided by vehicle force sensors, as well as suspension signals and steering signals.

7. The device according to claim 6, wherein balancing forces exerted on the device comprise compensating for a shift in a center of mass of the device, wherein the shift in the center of mass is a function of:
    the transit vehicle force components;
    the delivery platform force components;
    the device motion forces due to motion of the device;
    the gravity force on the device;
    the transit vehicle slope;
    the slope of the operating surface; and
    the orientation of the device.

8. The device according to claim 7, wherein the ballast assembly comprises a plurality of ballasts that are each rotatably and hingedly coupled to the body member, and provide movement in two axes of motion relative to the body member, wherein the controller causes at least one of selective movement of one or more of the plurality of ballasts or directional movement of the translation assembly in order to produce the compensation for the shift of the center of mass of the device.

9. The device according to claim 8, wherein the controller is further configured to:
    read data encoded into the fiduciary objects for navigating the device on the operating surface; and
    selectively control the translation assembly to perform the navigation.

10. The device according to claim 9, wherein the controller is further configured to utilize an intended motion of the device during navigation, and the orientation of the device is computed by the inertial measurement unit to further control the selective movement of one or more of the plurality of ballasts or directional movement of the translation assembly.

11. The device according to claim 1, wherein the desired orientation includes the delivery platform held at a position that prevents objects contacting an upper surface of the delivery platform from sliding off of the delivery platform when the device is in motion.

12. A method, comprising:
    determining, by one or more processors coupled to at least one memory, a location of a contact point between a translation assembly of a ballbot and an operating surface of a transit vehicle;
    sensing a slope and movement of the ballbot on the operating surface using camera input from a camera;
    receiving transit vehicle force components for the transit vehicle;
    computing a slope of the operating surface with respect to gravity;
    sensing a location of the ballbot within the transit vehicle;
    determining forces on the ballbot at the contact point comprising any of the transit vehicle force components, the location of the contact point, the slope, the movement of the ballbot, the slope of the operating surface with respect to gravity, and the location of the contact point of the ballbot, or any combination thereof; and
    selectively controlling at least one of a ballast assembly and a translation assembly of the ballbot so as to balance the forces on the ballbot at the contact point.

13. The method according to claim 12, further comprising measuring delivery platform force components comprising at least one of shear, normal, or torque forces of a delivery platform of the ballbot.

14. The method according to claim 13, wherein the ballbot further senses identification, location, and orientation of fiduciary objects on the operating surface.

15. The method according to claim 14, wherein the ballbot navigates through the transit vehicle using the fiduciary objects.

16. The method according to claim 15, further comprising sensing:
    an orientation of the ballbot relative to vehicle coordinates when the device is operating within a transit vehicle; and
    gravity and motion forces created by movement of the device along the operating surface.

17. The method according to claim 16, further comprising receiving the transit vehicle force components from signals provided by vehicle force sensors, as well as suspension signals and steering signals of the transit vehicle.

18. The method according to claim 17, further comprising causing at least one of pivoting or hinging of one or more of a plurality of ballasts or directional movement of the translation assembly in order to balance the forces exerted on the device.

19. The method according to claim 18, further comprising:
- reading data encoded into the fiduciary objects for navigating the ballbot on the operating surface;
- selectively controlling the translation assembly to perform the navigation; and
- wherein the controller is further configured to utilize an intended motion of the ballbot during navigation and the orientation of the ballbot to further control the selective movement of one or more of the plurality of ballasts or the directional movement of the translation assembly.

20. A system, comprising:
- a transit vehicle comprising an operating surface having one or more fiduciary objects positioned thereon; and
- a ballbot configured to move around the transit vehicle on the operating surface using the one or more fiduciary objects for navigation, wherein the ballbot transports at least one object placed on a delivery platform, the ballbot being configured to balance forces measured at a contact point between the ballbot and the operating surface, wherein the forces are caused by at least one of motion of the transit vehicle, motion of the ballbot, or gravity, wherein the ballbot balances the forces using at least one of a ballast assembly of the ballbot, a translation assembly of the ballbot, or a combination thereof, the forces being balanced so as to stabilize the ballbot and to prevent the at least one object from sliding off the delivery platform.

\* \* \* \* \*